United States Patent

Rebholz et al.

[11] Patent Number: 5,524,500
[45] Date of Patent: Jun. 11, 1996

[54] MULTI-STAGE REVERSING GEAR CHANGEABLE UNDER LOAD

[75] Inventors: Wolfgang Rebholz; Fritz Leber, both of Friedrichshafen, Germany

[73] Assignee: ZF Friedrichshafen AG, Friedrichshafen, Germany

[21] Appl. No.: 428,077

[22] PCT Filed: Dec. 11, 1993

[86] PCT No.: PCT/EP93/03509

§ 371 Date: Apr. 26, 1995

§ 102(e) Date: Apr. 26, 1995

[87] PCT Pub. No.: WO94/15115

PCT Pub. Date: Jul. 7, 1994

[30] Foreign Application Priority Data

Dec. 18, 1992 [DE] Germany ............ 42 42 941.2

[51] Int. Cl.⁶ .................................................. F16H 3/093
[52] U.S. Cl. .................................................. 74/331; 74/360
[58] Field of Search ........................................ 74/331, 360

[56] References Cited

U.S. PATENT DOCUMENTS 3,858,455 1/1975 Sisson et al. .................. 74/360
4,063,464 12/1977 Crabb ........................... 74/331
4,640,146 2/1987 Bubak ........................... 74/331
5,079,965 1/1992 Leber et al. .................... 74/331

FOREIGN PATENT DOCUMENTS 0293248 11/1988 European Pat. Off. .

*Primary Examiner*—Dirk Wright
*Attorney, Agent, or Firm*—Davis, Bujold & Streck

[57] ABSTRACT

The invention relates to a multi-stage reversing gear (1) that is changeable under load, especially as used in construction machines. The gear has a four-speed transmission (3) preferably fitted downstream of a changing set (2). The gear ratios can be changed via synchronous clutches (24, 25). To achieve compact construction, idler gears (11, 12) of the changing set (2) permanently engage with a fixed gear (14) of the transmission (3). The fixed gear (14) is fitted on a countershaft (15). The drive pinions (16, 17 or 20, 21) of the gear ratios are arranged to the left and right of the fixed gear (14) in relation to the longitudinal section of the reversing gear (1).

10 Claims, 1 Drawing Sheet

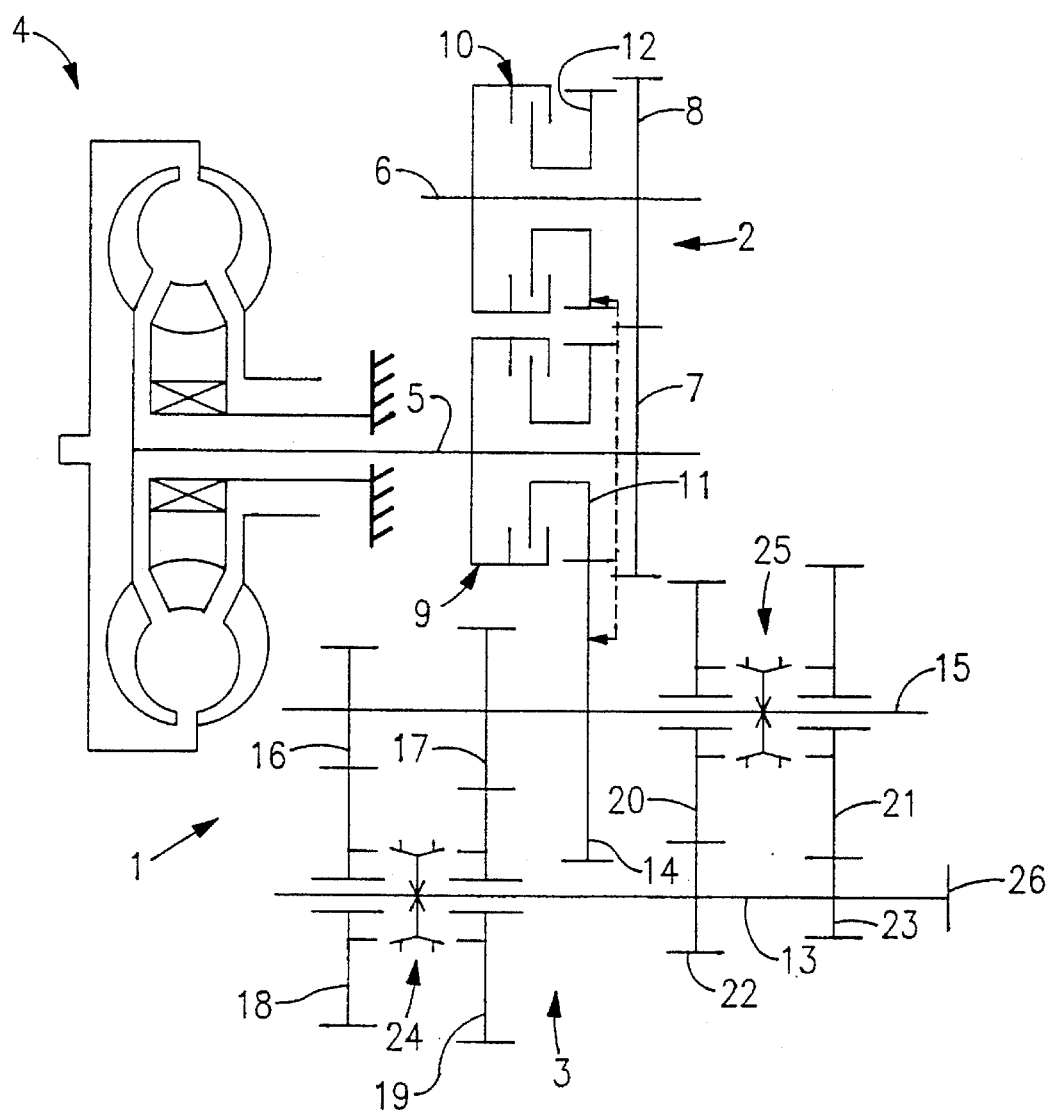

MULTI-STAGE REVERSING GEAR CHANGEABLE UNDER LOAD

The invention concerns a multi-stage reversing gear that is changeable under load, such as specially used in construction machines like excavators. The gear has an input shaft and a changing set consisting of a countershaft, fixed gears and idler gears with clutches for connecting one of said idler gears with the input shaft or countershaft. In this manner, it is possible to change the direction of rotation of an output shaft. In addition a transmission with synchronous clutches is fitted downstream of the changing set of the reversing gear. This is preferably a transmission having four speeds.

Reversing gears that are changeable under load are distinguished by a series of advantages. For this reason such gears are used in many commercial vehicles. The changing set combined with a hydrodynamic torque converter allows for smooth driving and reversing under load. When a transmission with synchronous clutches is fitted downstream of the reversing gear that is changeable under load, the driver can engage the adequate speed to be used. For example, in an excavator the work is done in the first or second speed, while the third and fourth speeds are available for transportation.

The multiplicity of working machines demands a constantly increasing degree of adaptability of the gear. It is in particular disadvantageous that the installation space can be considerably large, which is to be specially attributed to the considerable axial length and/or width of said gear.

This invention is based on the problem of providing a multi-stage reversing gear that is changeable under load, having a transmission with synchronous clutches fitted downstream for switching at least four speeds, which is especially distinguished by a small installation space.

The problem on which the invention is based is solved by the fact that, the idler gears of the changing set permanently mesh with a fixed gear, the drive pinion, of a countershaft of the transmission. To obtain a compact construction, in relation to the axial longitudinal section of the countershaft, two other fixed gears are situated on one side of said drive pinion and two idler gears are situated on the other side. The fixed gears here have a small diameter and form the input gears for the gear ratios 1 and 2. High reducing ratios can be obtained for said speeds, since the smallest diameters to be kept of said gears are not determined by structural parts of the synchronous clutch, as is the case with the idler gears. In gear ratios 3 and 4 the input gears are formed by the idler gears. Larger diameters can be used here so that the synchronous clutch can be housed without problem from the construction point of view. Gear ratios 1 to 4 are completed by two idler gears on the output shaft and two other fixed gears on the output shaft. The idler gears of the output shaft have in turn larger diameters so that a synchronous clutch can be installed without problem. The fixed gears on the output shaft, which are component parts of the gear ratios 3 and 4, have in turn smaller diameters. It can be readily understood that a large total ratio step of the gears can be achieved in this manner.

In a preferred embodiment of the gear according to the invention, the fixed gears are made integral with the countershaft. Hereby gear teeth of very small diameters can be easily produced. It is similarly advantageous to make the fixed gears integral with the output shaft.

The gears of larger diameters are advantageously designed as idler gears. It is therefore advantageous to situate two idler gears respectively on the countershaft and the output shaft and to associate with each a synchronous clutch.

When the driving connection between the idler gears of the changing set and the fixed gears of the countershaft is at a speed reducing ratio, the pairs of gears of the third and fourth speeds can have speed increasing ratios without the output speed thereby becoming too high. At the same time, the ratio in the fourth speed can be selected so that the total ratio step of the gears (between the first and the fourth speeds) can be completed in only two stages.

To achieve a compact construction, the distance between the axes of the countershaft and the output shaft corresponds substantially to the radius of the centrally situated fixed gear—in relation to the longitudinal section of the gear.

A simple construction results when an output flange is firmly connected with the output shaft. When needed, it is possible to situate another fixed gear upon the output shaft by which another input shaft can be driven as needed. This can be, for ex., the input of a front axle. Because of its compact construction, the gear according to the invention can be particularly used to advantage in a commercial vehicle such as an excavator or loader.

Other features essential to the invention, and the advantages resulting therefrom, are to be seen from the following description of an embodiment, with reference to the drawing.

In the drawing, a gear diagram of a reversing gear 1 that is changeable under load is reproduced. This is a multi-stage reversing gear, fundamentally consisting of a changing set 2 and a transmission 3 fitted downstream thereof. An hydrodynamic torque converter 4 can be fitted upstream of the reversing gear 1, as is generally the norm, for ex., in heavy construction vehicles.

The changing set 2 is specifically formed by an input shaft 5 of the reversing gear, a counter shaft 6 extending parallel therewith, two fixed gears 7 and 8, two clutches 9 and 10 and two idler gears 11 and 12.

The fixed gear 7 is non-rotatably connected with the input shaft 5. The fixed gear 8 is non-rotatably situated upon the countershaft 6. The idler gear 11 can be non-rotatably coupled with the input shaft 5 via the clutch 9 while the idler gear 12 is non-rotatably attached to the countershaft 6 when the clutch 10 is closed.

The clutches 9 and 10 are preferably multi-disc clutches that are hydraulically actuatable in the closing direction against the force of springs.

The clutches 9 and 10 are so-called directional clutches, since they can determine the direction of rotation of an output shaft 13 of the reversing gear 1. When driving forward, the clutch 9 is closed, while when reversing, the clutch 10 is actuated and the clutch 9 remains open.

It can be understood from the diagrammatic illustration that the idler gear 11 permanently meshes with a fixed gear 14 of a countershaft 15. This also applies to the idler gear 12 of the countershaft 6. This toothed gear also permanently meshes with the fixed gear 14, which is made clear by the connection marked with dotted lines in the drawing.

On the countershaft 15 of the transmission 3, two other fixed gears 16 and 17 are situated on one side of the fixed gear 14 (to the left of it). Said fixed gears are the input gears for the first and second speeds of the gear. Since high reducing ratios are concerned here, it is necessary that said fixed gears have small diameters. The diameters concerned here are smaller than those of idler gears, whose smallest possible diameters are defined by the bearings of the idler gear or the synchronizations. It is therefore advantageous to make the fixed gears 16 and 17 integral with the countershaft.

The fixed gears 16 and 17 are permanently meshed with idler gears 18 and 19 which are rotatably supported on the output shaft 13. Gear ratios 1 and 2 are completed by the idler gears 18 and 19. The idler gears 18 and 19 can be optionally non-rotatably connected with the output shaft 13 by a synchronous clutch 24, so that either the first or the second speed is engaged.

The ratio between the idler gears 11 and 12 and the fixed gear 14 is selected so as to obtain a speed reducing ratio. It is therefore possible to change to the increasing gear ratios 3 and 4, without the output speed of the gear becoming too high. The third and fourth gear ratios are formed by two idler gears 20 and 21 and two fixed gears 22 and 23. The idler gears 20 and 21 are rotatably supported on the countershaft 15. Each one of said idler gears can be non-rotatably connected with the countershaft 15 via another synchronous clutch 25. Since the diameters of the fixed gears 22 and 23—similarly to fixed gears 16 and 17—are not limited to a smallest possible gear diameter by gear bearings or structural parts of the synchronization, it is also possible here to prepare high ratio stages for the third or fourth speed. It is also advantageous here to make the fixed gears 22 and 23 integral with the output shaft 13.

The total ratio step of the reversing gear 1 between the first and fourth speeds, which in the commercial vehicles concerned must be very great, can be achieved without problem by the gear pairs 16-18 and 21-23, that is, in only two stages. An output flange 24 is non-rotatably connected with the output shaft 13, which contributes to a simple design of the gear.

In a modified embodiment another fixed gear, engageable in case of need for the input of an input shaft, can be situated between the idler and fixed gears of the output shaft 13. This could be, for ex., the input of a front axle.

| Reference numbers |
| --- |
| 1 reversing gear |
| 2 changing set |
| 3 transmission |
| 4 torque converter |
| 5 input shaft |
| 6 countershaft |
| 7 fixed gear |
| 8 fixed gear |
| 9 clutch |
| 10 clutch |
| 11 idler gear |
| 12 idler gear |
| 13 output shaft |
| 14 fixed gear |
| 15 countershaft |
| 16 fixed gear |
| 17 fixed gear |
| 18 idler gear |
| 19 idler gear |
| 20 idler gear |
| 21 idler gear |
| 22 fixed gear |
| 23 fixed gear |
| 24 synchronous clutch |
| 25 synchronous clutch |
| 26 output flange |

We claim:

1. A multi-stage reversing gear being changeable under load, having one input shaft (5), that supports one fixed gear (7, 8) and one idler gear (11), and one countershaft (6), that supports one fixed gear (8) and one idler gear (12), wherein both fixed gears (7, 8) permanently mesh with each other and wherein said idler gears (11, 12) are connectable via associated clutches (8, 10) with said input shaft and said countershaft, respectively, and thus form a reversing gear downstream of which is fitted a transmission (3) having one output shaft (13) and synchronous clutches for changing at least four speeds, wherein both idler gears (11, 12) of said reversing gear permanently mesh with one upstream fixed gear (14) of said transmission (3) lodged on a countershaft (15);

and two other fixed gears (16, 17) of small diameter are situated on one side of said upstream fixed gear (14), in relation to the longitudinal section of said countershaft (15) of said transmission, and two other idler gears (20, 21) of large diameter are situated on the other side of said upstream fixed gear (14);

and said two other fixed gears (16, 17) permanently mesh with two idler gears (18, 19) of large diameter lodged on said output shaft (13) and said two other idler gears (20, 21) permanently mesh with two fixed gears (22, 23) of small diameter lodged on said output shaft (13).

2. A gear according to claim 1, characterized in that said fixed gears (16, 17) are made integral with said countershaft (15).

3. A gear according to claim 1, characterized in that said fixed gears (22, 23) are made integral with said output shaft (13).

4. A gear according to claim 1, characterized in that one synchronous clutch (24, 25) is associated respectively with said idler gears (20, 21) of said countershaft (15) and with said idler gears (18, 19) of said output shaft (13).

5. A gear according to claim 1, characterized in that the driving connection between said idler gears (11, 12) of said changing set and said fixed gear (14) of said countershaft (15) results in a speed reducing ratio.

6. A gear according to claim 1 characterized in that the driving connection between said idler gears (20, 21) of said countershaft (15) and said fixed gears (22, 23) of said output shaft (13) results in a speed increasing ratio.

7. A gear according to claim 1, characterized in that the distance between the axes of said countershaft (15) and said output shaft (13) substantially corresponds to the radius of the centrally situated fixed gear (14).

8. A gear according to claim 1, characterized in that an output flange (24) is firmly connected with said output shaft (13).

9. A gear according to claim 1, characterized in that another fixed gear is fitted, engageable as needed, between said idler and fixed gears of said output shaft (18, 19 and 22, 23) for driving an input shaft.

10. A gear according to claim 1, characterized by being used in an excavator loader.

* * * * *